(12) United States Patent
Zeng et al.

(10) Patent No.: US 11,381,828 B2
(45) Date of Patent: Jul. 5, 2022

(54) METHOD AND DISPLAY DEVICE FOR DETERMINING SIMILARITY OF ADJACENT ROWS OF AN IMAGE

(71) Applicant: HKC CORPORATION LIMITED, Guangdong (CN)

(72) Inventors: Dekang Zeng, Guangdong (CN); Shuixiu Hu, Guangdong (CN)

(73) Assignee: HKC CORPORATION LIMITED, Guangdong (CN)

(*) Notice: Subject to any disclaimer, the term of this patent is extended or adjusted under 35 U.S.C. 154(b) by 0 days.

(21) Appl. No.: 17/252,288

(22) PCT Filed: Dec. 26, 2018

(86) PCT No.: PCT/CN2018/123785
§ 371 (c)(1),
(2) Date: Dec. 15, 2020

(87) PCT Pub. No.: WO2020/124629
PCT Pub. Date: Jun. 25, 2020

(65) Prior Publication Data
US 2021/0266574 A1 Aug. 26, 2021

(30) Foreign Application Priority Data
Dec. 19, 2018 (CN) .......................... 201811558947.9

(51) Int. Cl.
*H04N 19/523* (2014.01)
*H04N 19/186* (2014.01)

(52) U.S. Cl.
CPC .................................. *H04N 19/186* (2014.11)

(58) Field of Classification Search
CPC .................................................... H04N 19/186
(Continued)

(56) References Cited

U.S. PATENT DOCUMENTS

2003/0146896 A1  8/2003  Sekine
2006/0132860 A1* 6/2006  Roh .................... H04N 19/60
                                                       358/463
(Continued)

FOREIGN PATENT DOCUMENTS

CN    1681293 A    10/2005
CN    101639858 A   2/2010
(Continued)

OTHER PUBLICATIONS

Haigen Yao et al., Digital Halftoning Technology, Dec. 2012, ISBN: 978-7-5142-0781-1, Reconstruction effect evaluation chapter, p. 236.
(Continued)

*Primary Examiner* — Albert Kir (57) ABSTRACT

A method for determining similarity of adjacent rows of an image, the method includes: obtaining feature value of corresponding sub-pixel of each row of image data in a frame of image data; compressing obtained feature values of the corresponding sub-pixels of each row of image data to obtain compressed feature values of the corresponding sub-pixels of each row of image data; subtracting compressed feature values of corresponding sub-pixels of two adjacent rows of image data in the frame of image data, and summing absolute values of multiple differences obtained from subtracting; and determining similarity of the two adjacent rows of image data in the frame of image data according to the summed value. The present application further provides a display device.

7 Claims, 4 Drawing Sheets

(58) Field of Classification Search
USPC .................................................. 375/240.01
See application file for complete search history.

(56) References Cited

U.S. PATENT DOCUMENTS

| | | | |
|---|---|---|---|
| 2014/0185938 A1 | 7/2014 | Tamayama et al. | |
| 2015/0163432 A1* | 6/2015 | Tsuchida | G06K 9/00973 348/302 |
| 2016/0037061 A1* | 2/2016 | Lim | H04N 5/23229 348/241 |
| 2018/0020231 A1 | 1/2018 | Winetraub et al. | |
| 2018/0309944 A1* | 10/2018 | Lee | G09G 5/363 |
| 2019/0281225 A1* | 9/2019 | Yamazaki | H04N 5/232122 |

FOREIGN PATENT DOCUMENTS

| | | | |
|---|---|---|---|
| CN | 103915076 A | | 7/2014 |
| CN | 105304048 A | | 2/2016 |
| CN | 105335749 A | | 2/2016 |
| CN | 106454509 A | | 2/2017 |
| CN | 107026998 A | * | 8/2017 |
| CN | 107026998 A | | 8/2017 |
| CN | 105335749 B | * | 5/2019 |

OTHER PUBLICATIONS

Jingwen Yan, Digital Image Processing: Matlab Edition, Feb. 2007, ISBN: 7-118-04886-0, Block matching algorithm chapter, p. 126.
Wang Yao-Li, Wen Ting-Dun, Wang Zhi-Bin, Zhang Rui, Song Yan-Peng, "Chromatism Analysis of Multispectral Imaging System Based on AOTF and Hardware Compensation Strategy", Spectroscopy and Spectral Analysis, Jul. 2016, vol. 36, No. 7, pp. 2306-2311.
Chia-Hao Fang, I-Tao Lung, and Chih-Peng Fan, "Absolute Difference and Low-Power Bus Encoding Method for LCD Digital Display Interfaces", VLSI Design, 2012, vol. 2012, Article ID 657897, pp. 1-6, Hindawi Publishing Corporation, DOI: 10.1155/2012/657897.
First Office Action in counterpart Chinese Application No. 201811558947.9, dated May 28, 2020.
The Second Office Action in counterpart Chinese Application No. 201811558947.9, dated Feb. 3, 2021.
International Search Report in corresponding PCT Application No. PCT/CN2018/123785, dated Jul. 1, 2019.
Written Opinion of the International Searching Authority in corresponding PCT Application No. PCT/CN2018/123785, dated Jul. 1, 2019.

* cited by examiner

METHOD AND DISPLAY DEVICE FOR DETERMINING SIMILARITY OF ADJACENT ROWS OF AN IMAGE

CROSS REFERENCES TO RELATED APPLICATIONS

The present application is the National Stage of International Application No. PCT/CN2018/123785, filed on Dec. 26, 2018, which claims the priority of a Chinese patent application No. CN201811558947.9, titled "Method for Determining Similarity of Adjacent Rows of an Image", filed in the Chinese Patent Office on Dec. 19, 2018, the entire content of which is hereby incorporated herein by reference.

FIELD

The present application relates to the field of image processing, and more specifically to a method and display device for determining similarity of adjacent rows of an image.

BACKGROUND

The statements here only provide background information related to the present application, and do not necessarily constitute prior art.

With the rapid development of liquid crystal panels, customer groups have higher and higher requirements for the display taste of liquid crystal panels. Many of improvements in quality are achieved by algorithms. Therefore, the liquid crystal panel industry has derived many algorithms. Different algorithms can lighten the existing defects of liquid crystal panels and improve qualities of products.

Currently, algorithms in the liquid crystal panel industry includes what is for calculating the similarity of an image. However, algorithms commonly used for calculating the similarity are qualitative rather than quantitative, and the calculation results are not accurate.

SUMMARY

According to various embodiments of the present application, a method for determining similarity of adjacent rows of an image and a display device are provided.

According to one aspect of the present application, a method for determining similarity of adjacent rows of an image is provided, the method includes: obtaining feature values of corresponding sub-pixels of each row of image data in a frame of image data; compressing obtained feature values of corresponding sub-pixels of each row of image data to obtain compressed feature values of corresponding sub-pixels of each row of image data; subtracting compressed feature values of corresponding sub-pixels of two adjacent rows of image data in the frame of image data, and summing absolute values of multiple differences obtained from the subtracting; and determining similarity of the two adjacent rows of image data in the frame of image data according to a summed value obtained from the summing.

According to another aspect of the present application, a method for determining similarity of adjacent rows of an image is provided, the method includes: obtaining feature values of corresponding sub-pixels of each row of image data in a frame of image data, a number of total rows in the frame of image data being N; compressing obtained feature values of corresponding sub-pixels of each row of image data to obtain compressed feature values of corresponding sub-pixels of each row of image data; subtracting compressed feature values of corresponding sub-pixels of row n and row n−1 of image data in the frame of image data, and summing absolute values of multiple differences obtained from the subtracting; determining similarity of the row n and row n−1 of image data in the frame of image data according to a summed value obtained from the summing, and judging whether n equates to N, in determining that n equates to N, ending processing, in determining that n is not equal to N, increasing n by 1 that is n=n+1 and returning to "subtracting compressed feature values of corresponding sub-pixels of row n and row n−1 of image data in the frame of image data, and summing absolute values of multiple differences obtained from the subtracting", where the initial value of n is 2.

According to still another aspect of the present application, a display device is provided, the display device includes an apparatus for determining similarity of adjacent rows of an image, the apparatus includes a processor and a memory, and the processor is configured to execute a computer program stored in the memory to implement the following steps: obtaining feature values of corresponding sub-pixels of each row of image data in a frame of image data; compressing obtained feature values of corresponding sub-pixels of each row of image data to obtain compressed feature values of corresponding sub-pixels of each row of image data; subtracting compressed feature values of corresponding sub-pixels of two adjacent rows of image data in the frame of image data, and summing absolute values of multiple differences obtained from the subtracting; and determining similarity of the two adjacent rows of image data in the frame of image data according to a summed value obtained from the summing.

The details of one or more embodiments of the present application are set forth in the following drawings and description. Other features, purposes and advantages of the present application will become apparent from the description, drawings and claims.

BRIEF DESCRIPTION OF THE DRAWINGS

For more clearly explanation of the technical solutions in the embodiments or exemplary technologies of the present application, the drawings required in the description of the embodiments or exemplary technologies will be simply introduced as below. Obviously, the drawings described as below are merely some embodiments of the present application. For one of ordinary skilled in the art, the drawings of other embodiments can be obtained based on those drawings without creative work.

DETAILED DESCRIPTION OF THE EMBODIMENTS

For more clear understanding of the purpose, technical solutions, and advantages of the present application, the further description of the present application in detail will be conjunction with the drawings and embodiments as below. It should be understood that the specific embodiments described here are merely used to explain the present application, and not limited thereto.

It should be noted that when an element is referred to as being "disposed on" another element, it can be directly on another element or there are intermediate elements between them. When an element is referred to as being "connected to" another element, it can be directly connected to another element or there are intermediate elements between them. The terms "vertical", "horizontal", "left", "right" and similarity expressions used herein are for explanation only and do not mean it is the only implementation.

Unless otherwise defined, all technical and scientific terms used herein have the same meaning as commonly understood by one of ordinary skilled in the art of the present application. The terms used in the description of the present application herein are only for description of specific embodiments and are not intended to limit the present application. The various technical features in the above embodiments can be combined arbitrarily. For concise of the description, all possible combinations of the technical features in the above embodiments are not described. However, as long as there are no contradiction in the combination of these technical features, all those combinations should be considered to be within the range of this description.

Figure 1:
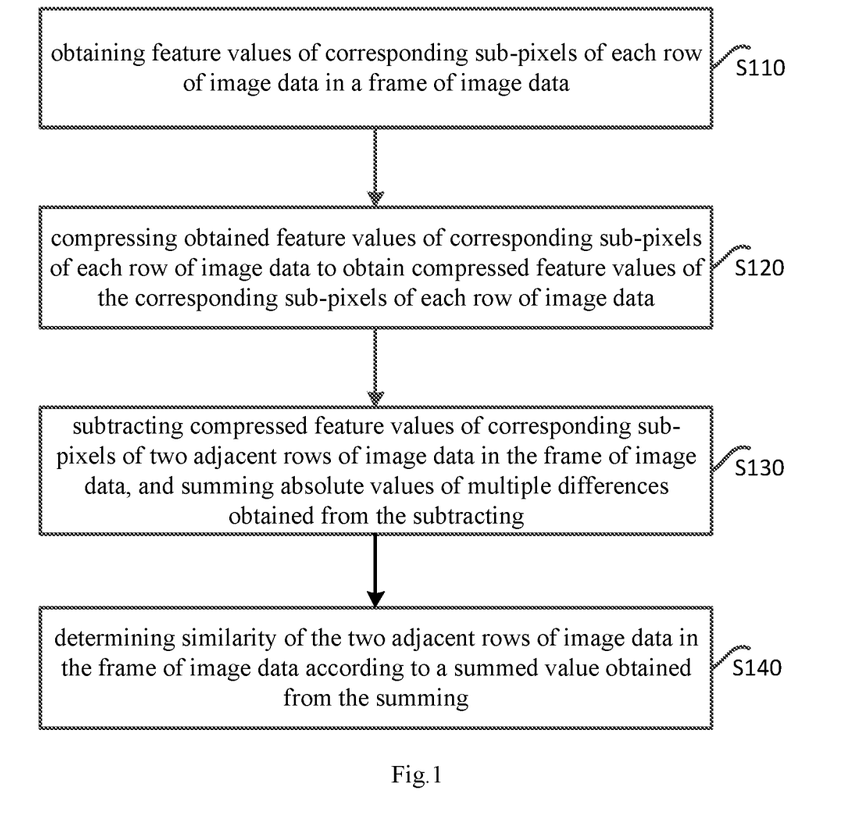
FIG. 1 is a flowchart of a method for determining similarity of adjacent rows of an image according to an embodiment.

The embodiment of the present application provides a method for determining similarity of adjacent rows of an image, as shown in FIG. 1, the method can include the following steps:

Step S110, obtaining feature values of corresponding sub-pixels of each row of image data in a frame of image data.

Step S120, compressing obtained feature values of corresponding sub-pixels of each row of image data to obtain compressed feature values of the corresponding sub-pixels of each row of image data.

Step S130, subtracting compressed feature values of corresponding sub-pixels of two adjacent rows of image data in the frame of image data, and summing absolute values of multiple differences obtained from the subtracting.

Step S140, determining similarity of the two adjacent rows of image data in the frame of image data according to a summed value obtained from the summing.

Specifically, a frame of image is a still image, and continuous frames form animation, such as television images, etc. A frame of image includes multiple rows, each row of image includes multiple sub-pixels. The feature values of corresponding sub-pixels of each row of image data in a frame of image data is obtained for subsequent comparison and calculation. For reducing a storage capacity required for calculation, the obtained feature values are compressed to obtain compressed feature values of corresponding sub-pixels of each row of image data, and for determining similarity of adjacent rows of an image, compressed feature values of corresponding sub-pixels of two adjacent rows of image data in the image data are subtracted, and absolute values of multiple differences obtained from the subtracting are summed, and then similarity of the two adjacent rows of image data in the frame of image data is determined according to a summed value obtained from the summing.

By compressing feature values of corresponding sub-pixels of each row of image data in a frame of image; and subtracting compressed feature values of corresponding sub-pixels of two adjacent rows of image data, and summing absolute values of multiple differences obtained from the subtracting; and determining similarity of the two adjacent rows of image data according to a summed value obtained from the summing, the above method for determining similarity of adjacent rows of an image can conveniently and quickly determine similarity of two adjacent rows of display data and reduce the amount of data stored in the storage register by compressing, thereby reducing costs.

In one of embodiments, a feature value of a sub-pixel can include any one of gray value, chroma and brightness, etc.

In one of embodiments, a feature value of a corresponding sub-pixel is a gray value of the corresponding sub-pixel. Adopting a gray value as the feature value can easily and quickly calculate a value of the feature value.

In one of embodiments, Step S110, obtaining feature values of corresponding sub-pixels of each row of image data in a frame of image data, includes: calculating the gray values of the corresponding sub-pixels of each row of image data in the frame of image data to acquire the gray values of corresponding sub-pixels of each row of image data.

Specifically, feature value of a corresponding sub-pixel can be a gray value of the corresponding sub-pixel, thus Step S110 includes calculation of the gray values of the corresponding sub-pixels of image data to acquire the gray values of the corresponding sub-pixels of each row of image data.

In one of embodiments, Step S120, compressing obtained feature values of corresponding sub-pixels of each row of image data to obtain compressed feature values of the corresponding sub-pixels of each row of image data includes: dividing obtained gray values of corresponding sub-pixels of each row of image data by m and rounding down to obtain compressed gray values of the corresponding sub-pixels of each row of image data, where m can be any one of 2, 4, 8 and 16.

Specifically, after obtaining gray values of corresponding sub-pixels of each row of image data in a frame of image data, for saving storage space required for calculation, the obtained gray values are compressed. In this embodiment, the compressing method is to divide the obtained gray values of the corresponding sub-pixels of each row of image data by m and then rounding down, m can be any one of 2, 4, 8, and 16. A range of a gray value is 0~255 and it occupies 8 bits when stored. When m=2, a range of the compressed gray value is 0~127 and it occupies 7 bits when stored, so 1 bit is reduced after compression. When m=4, a range of the compressed gray value is 0~63 and it occupies 6 bits when stored, thus 2 bits are reduced after compression. When m=8, a range of the compressed gray value is 0~31 and it occupies 5 bits when stored, thus 3 bits are reduced after compression. When m=16, a range of the compressed gray value is 0-15 and it occupies 4 bits when stored, thus 4 bits are reduced after compression.

The method in the above embodiment can significantly reduce the storage capacity required for storage by compressing the gray values, thereby significantly saving the cost of the integrated circuits.

In one of embodiments, Step S130, subtracting compressed feature values of the corresponding sub-pixels of the two adjacent rows of image data in the frame of image data, and summing absolute values of multiple differences obtained from the subtracting, includes: subtracting the compressed gray values of the corresponding sub-pixels of the two adjacent rows of image data in the frame of image data to acquire the multiple differences, a number of the multiple differences equaling to a number of the corresponding sub-pixels of each row of image data in the frame of image data, and summing the absolute values of the multiple differences.

Specifically, after obtained gray values of corresponding sub-pixels of each row of image data in a frame of image data are compressed, compressed gray values of the corresponding sub-pixels of the two adjacent rows of image data are subtracted, thereby obtaining multiple differences, a number of the multiple differences equates to a number of corresponding sub-pixels of a row of image data. For balance of a difference between the two rows of image data, absolute values of multiple differences are summed here, and a summed value obtained from the summing represents a total difference between the two rows of image data.

In one of embodiments, Step S140, determining similarity of the two adjacent rows of image data in the frame of image data according to a summed value obtained from the summing, includes:

determining similarity of the two adjacent rows of image data according to a formula: $Similar(n)=(1-(H\_data(n)/(X*Y))*100\%$, where Similar(n) represents similarity of row n and row n−1 of image data in the frame of image data, n=2, 3 . . . N, N is a number of total rows in the frame of image; H_data (n) is a value obtained by summing absolute values of differences obtained from subtracting compressed gray values of corresponding sub-pixels of row n and row n−1 of image data; X is a number of the sub-pixels of a row of image data in the frame of image data; Y is related to m, when m=2, then Y=127; when m=4, then Y=63; when m=8, Y=31; when m=16, then Y=15.

When adopting m to compress gray values, a range of compressed gray value is 0~Y, a maximum difference between gray values of two sub-pixels is Y. X*Y is a maximum value of a sum of absolute values of differences between gray values of two adjacent rows of image data. A ratio of the summed value H_data(n) and X*Y measures differences of gray values of adjacent rows, and 1 subtracting the ratio can measure similarity of the adjacent rows. For example, when H_data (n)=X*Y, Similar(n) is 0, that is, the adjacent rows are completely different. When H_data(n)=0, Similar(n) is 100%, that is, the adjacent rows are completely identical. When H_data(n) is between 0 and X*Y, Similar(n) is between 0 and 100% and represents similarity of the adjacent rows, the larger the value, the higher similarity of the adjacent rows.

When feature values are compressed by dividing gray values by m and rounding down, an error of a feature value does not exceed m. A maximum difference between gray values of two sub-pixels is Y, and Y is a value obtained by dividing 255 by m and rounding down. Since it is a ratio of H_data(n) and X*Y that included in the formula for calculating similarity, an error of similarity is smaller. For example, when m=4, a maximum error of a feature value is 4. For an application of rough data comparison, a difference of gray scale being 4 will not affect the result, so it will not affect the use of the algorithm itself. In practical applications, m can be selected according to the actual requirements of the specific application (for example, calculation accuracy and/or cost).

The method in the above embodiment can conveniently and quickly determine similarity of two adjacent rows according to the formula, the calculation process is simple, the calculation result is intuitive and convenient for subsequent analysis and processing.

In one of embodiments, m is 2 or 4. When m is 2 or 4, one advantage is reducing the storage capacity required for storage and another advantage is a smaller error caused by compressing, without any effect on the use of the algorithm itself.

Figure 2:
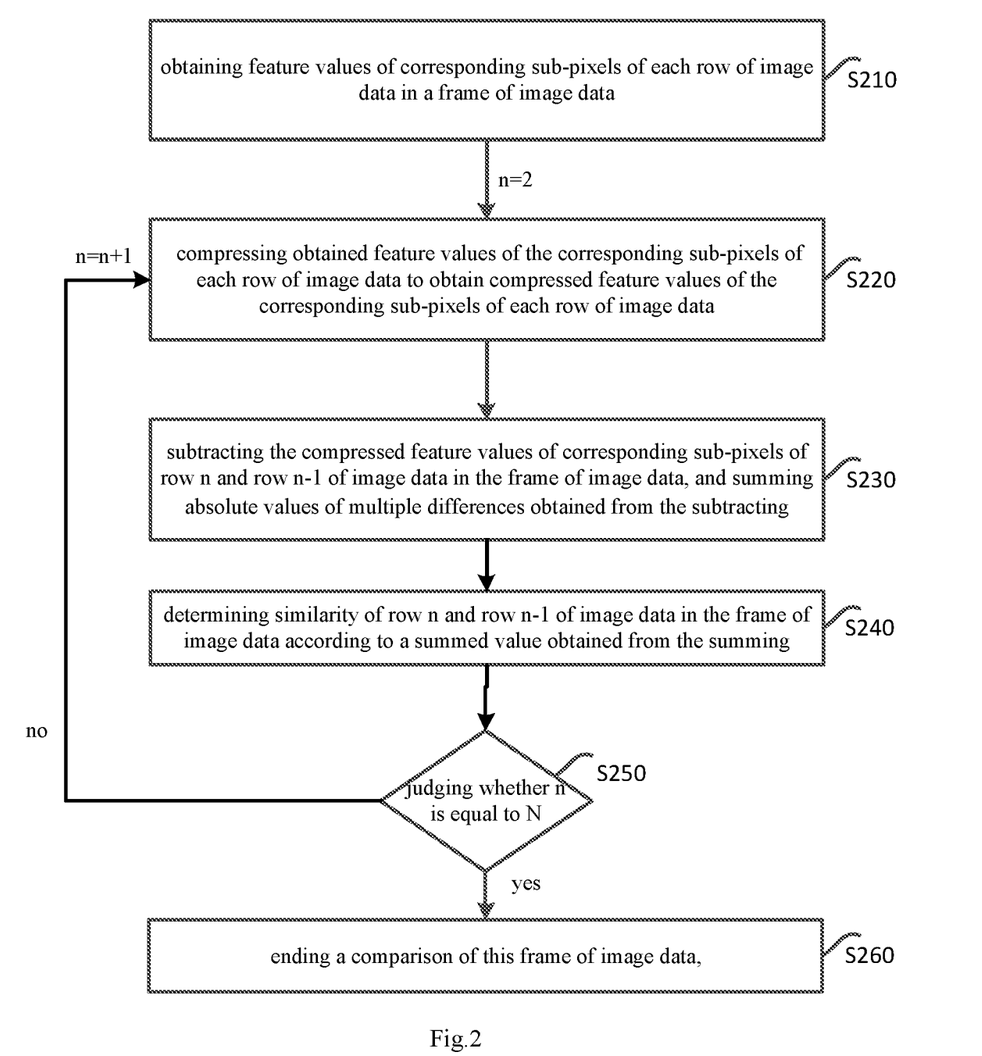
FIG. 2 is a flowchart of a method for determining similarity of adjacent rows of an image according to an embodiment.

The embodiment of the present application further provides a method for determining similarity of adjacent rows of an image, as shown in FIG. 2, the method includes:

Step S210, obtaining feature values of corresponding sub-pixels of each row of image data in a frame of image data, a number of total rows in the frame of image data being N;

Step S220, compressing obtained feature values of the corresponding sub-pixels of each row of image data to obtain compressed feature values of the corresponding sub-pixels of each row of image data;

Step S230, subtracting the compressed feature values of corresponding sub-pixels of row n and row n−1 of image data in the frame of image data, and summing absolute values of multiple differences obtained from the subtracting;

Step S240, determining similarity of row n and row n−1 of image data in the frame of image data according to a summed value obtained from the summing;

Step S250, judging whether n equates to N, in determining that n equates to N, performing Step S260, in determining that n is not equal to N, increasing n by 1, that is n=n+1 and returning to Step S230 to repeat Step S230 to Step S250;

Step S260, ending a comparison of this frame of image data;

Where, an initial value of n is 2.

Specifically, firstly the feature values of corresponding sub-pixels of each row of image data in a frame of image data are obtained, and then obtained feature values are compressed to obtain compressed feature values and compressed feature values of corresponding sub-pixels of row n and row n−1 of image data in the frame of image data are subtracted. Absolute values of multiple differences obtained from subtracting are summed, and similarity of row n and row n−1 of image data is determined according to the summed value, and finally whether n equates to N is judged. When n equates to N, the process is finished, otherwise n=n+1 and steps S220-S240 are repeated. The initial value of n is 2. The Similar(n) of all adjacent rows in the frame of image data can be obtained by the above method, with n=2, 3, 4 N.

By compressing obtained feature values of corresponding sub-pixels of each row of image data in a frame of image data; subtracting compressed feature values of corresponding sub-pixels of two adjacent rows of image data, summing absolute values of multiple differences obtained from subtracting; determining similarity of the two adjacent rows of image data according to the summed value, and judging whether it is the last row, the method for determining similarity of adjacent rows of an image in above embodiments can accurately and quickly determine similarity of all adjacent rows in the frame of image data, thereby saving cost of the integrated circuits.

In one of embodiments, a feature value of a corresponding sub-pixel can include any one of gray value, chroma and brightness, etc. of the corresponding sub-pixel.

In one of embodiments, a feature value of a corresponding sub-pixel is a gray value of the corresponding sub-pixel. Adopting a gray value as the feature value can easily and quickly calculate a value of the feature value.

In one of embodiments, Step S210, obtaining feature values of corresponding sub-pixels of each row of image data in a frame of image data, includes: calculating the gray values of the corresponding sub-pixels of each row of image data in the frame of image data to acquire the gray values of the corresponding sub-pixels of each row of image data.

Specifically, a feature value of a corresponding sub-pixel can be a gray value of the corresponding sub-pixel, thus Step S210 includes calculation of the gray values of the corresponding sub-pixels of image data to acquire the gray values of the corresponding sub-pixels of each row of image data.

Figure 3:
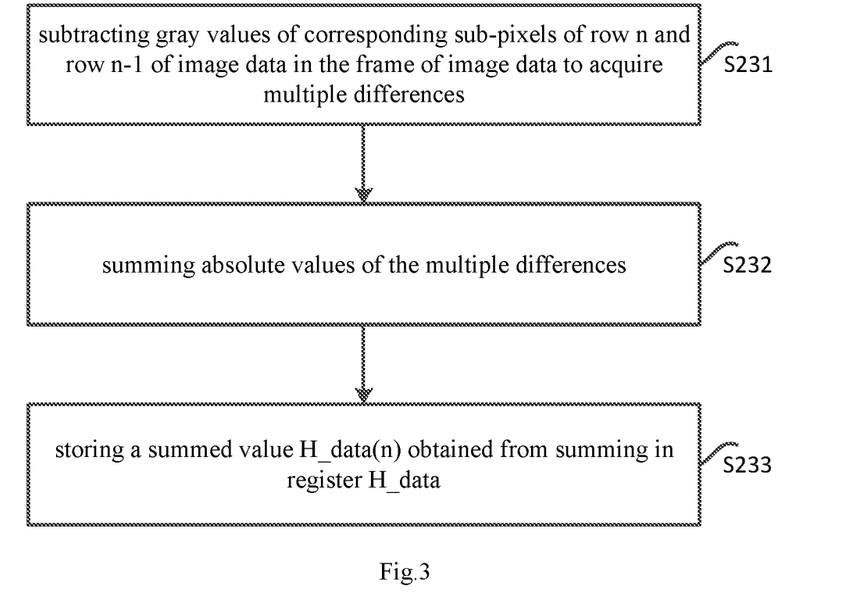
FIG. 3 is a flowchart of step S230 of the method of FIG. 2 according to an embodiment.

In one of embodiments, shown in FIG. 3, Step S220, compressing obtained feature values of corresponding sub-pixels of each row of image data to obtain compressed feature values of corresponding sub-pixels of each row of image data, includes: dividing obtained gray values of corresponding sub-pixels of each row of image data by m and rounding down to obtain compressed gray values of corresponding sub-pixels of each row of image data, where m is any one of 2, 4, 8 and 16.

Specifically, after obtaining gray values of corresponding sub-pixels of each row of image data in a frame of image data, for saving storage space required for calculation, obtained gray values are compressed. In this embodiment, the compressing method is to divide obtained gray values of corresponding sub-pixels of each row of image data by m and then rounding down, m can be any one of 2, 4, 8, and 16. A range of a gray value is 0~255 and it occupies 8 bits when stored. When m=2, a range of the compressed gray value is 0~127 and it occupies 7 bits when stored, thus 1 bit is reduced after compression. When m=4, a range of the compressed gray value is 0~63 and it occupies 6 bits when stored, thus 2 bits are reduced after compression. When m=8, a range of the compressed gray value is 0~31 and it occupies 5 bits when stored, thus 3 bits are reduced after compression. When m=16, a range of the compressed gray value is 0-15 and it occupies 4 bits when stored, so 4 bits are reduced after compression.

In one of embodiments, shown in FIG. 3, Step S230, subtracting feature values of corresponding sub-pixels of row n and row n−1 of image data in the frame of image data, and summing absolute values of multiple differences obtained from the subtracting, includes:

Step S231, subtracting compressed gray values of the corresponding sub-pixels of row n and row n−1 of image data in the frame of image data to acquire multiple differences, a number of the multiple differences equaling to a number of the corresponding sub-pixels of each row of image data in the frame of image data.

Step S232, summing absolute values of the multiple differences.

Step S233, storing a summed value H_data(n) obtained from summing in register H_data.

Specifically, after obtained gray values of corresponding sub-pixels of each row of image data in the frame of image data are compressed, compressed gray values of the corresponding sub-pixels of row n and row n−1 of image data are subtracted, thereby obtaining multiple differences, a number of the multiple differences equates to a number of the corresponding sub-pixels of a row of image data. For balance of a difference between two rows of image data, absolute values of multiple differences are summed here, and a summed value H_data(n) represents a total difference between the two rows of image data. H_data(n) is stored in register H_data for reading in subsequent calculation processing.

Figure 4:
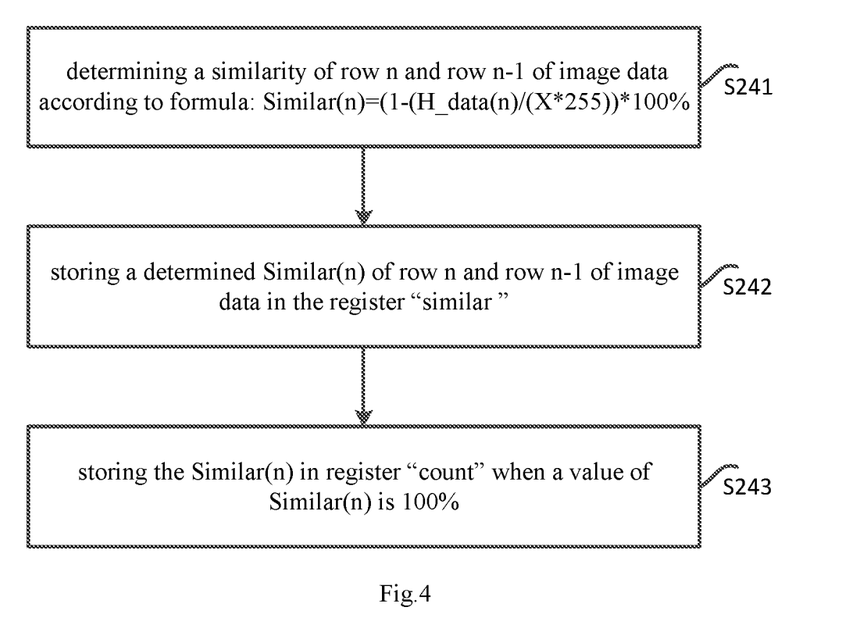
FIG. 4 is a flowchart of step S240 of the method of FIG. 2 according to an embodiment.

In one of embodiments, shown in FIG. 4, Step S240, determining similarity of row n and row n−1 of image data in the frame of image data according to a summed value, includes:

Step S241, determining similarity of row n and row n−1 of image data according to formula: Similar(n)=(1−(H_data(n)/(X*Y))*100%.

where Similar(n) is similarity of row n and row n−1 of image data in the frame of image data, where n=2, 3 . . . N; H_data (n) is a value obtained by summing absolute values of differences obtained from subtracting compressed gray values of corresponding sub-pixels of row n and row n−1 of image data; X is a number of the sub-pixels of a row of image data in the frame of image data; Y is related to m, when m=2, Y=127; when m=4, Y=63; when m=8, Y=31; and when m=16, Y=15.

When adopting m to compress gray values, a range of compressed gray value is 0~Y, a maximum difference between gray values of two sub-pixels is Y. X*Y is a maximum value of a sum of absolute values of differences between gray values of two adjacent rows of image data. A ratio of the summed value H_data(n) and X*Y measures differences of gray values of adjacent rows, and 1 subtracting the ratio can measure similarity of the adjacent rows. For example, when H_data (n)=X*Y, Similar(n) is 0, that is, the adjacent rows are completely different. When H_data(n)=0, Similar(n) is 100%, that is, the adjacent rows are completely identical. When H_data(n) is between 0 and X*Y, Similar(n) is between 0 and 100% and represents similarity of the adjacent rows, the larger the value is, the higher similarity of the adjacent rows will be.

When feature values are compressed by dividing gray values by m and rounding down, an error of a feature value does not exceed m. A maximum difference between gray values of two sub-pixels is Y, and Y is obtained by dividing 255 by m and rounding down. Since it is a ratio of H_data(n) and X*Y that included in the formula for calculating similarity, an error of similarity is smaller. For example, when m=4, a maximum error of a feature value is 4. For an application of rough data comparison, a difference of gray scale being 4 will not affect the result, so it will not affect the use of the algorithm itself. In practical applications, m can be selected according to the actual requirements of the specific application (for example, calculation accuracy and/or cost).

The method in the above embodiment can conveniently and quickly determine similarity of two adjacent rows according to the formula, the calculation process is simple, the calculation result is intuitive and convenient for subsequent analysis and processing.

In one of embodiments, m is 2 or 4. When m is 2 or 4, one advantage is reducing the storage capacity required for storage and another advantage is a smaller error caused by compressing, without any effect on the use of the algorithm itself.

Continuously referring to FIG. 4, in one of embodiments, Step S240, determining similarity of row n and row n−1 of image data in the frame of image data according to the summed value, further includes:

Step S242, storing a determined Similar(n) of row n and row n−1 of image data in the register "similar".

Specifically, after calculating a similarity, whether to perform the subsequent image processing can be determined according to the similarity. For example, when similarity of the two adjacent rows is larger, one of the two adjacent rows can be deleted. Therefore, it is necessary to store the determined Similar(n) of row n and row n−1 of image data in register "similarity" for the subsequent image processing. Similar(n) represents similarity, and n represents a serial number of rows to compare, for example, similarity (3)=80% represents that similarity of row 3 and row 2 is 80%.

Continuously referring to FIG. 4, in one of embodiments, Step S240, determining similarity of row n and row n−1 of image data in the frame of image data according to a summed value obtained from the summing, further includes:

Step S243, storing the Similar(n) in register "count" when Similar(n) is 100%.

Specifically, when similarity is 100%, it represents that the two rows of image data are completely identical. When similarity is 100%, then it is stored in register "count". In such way, if image data need to be deleted or integrated, rows with similarity being 100% can be deleted or integrated preferentially.

Figure 5:
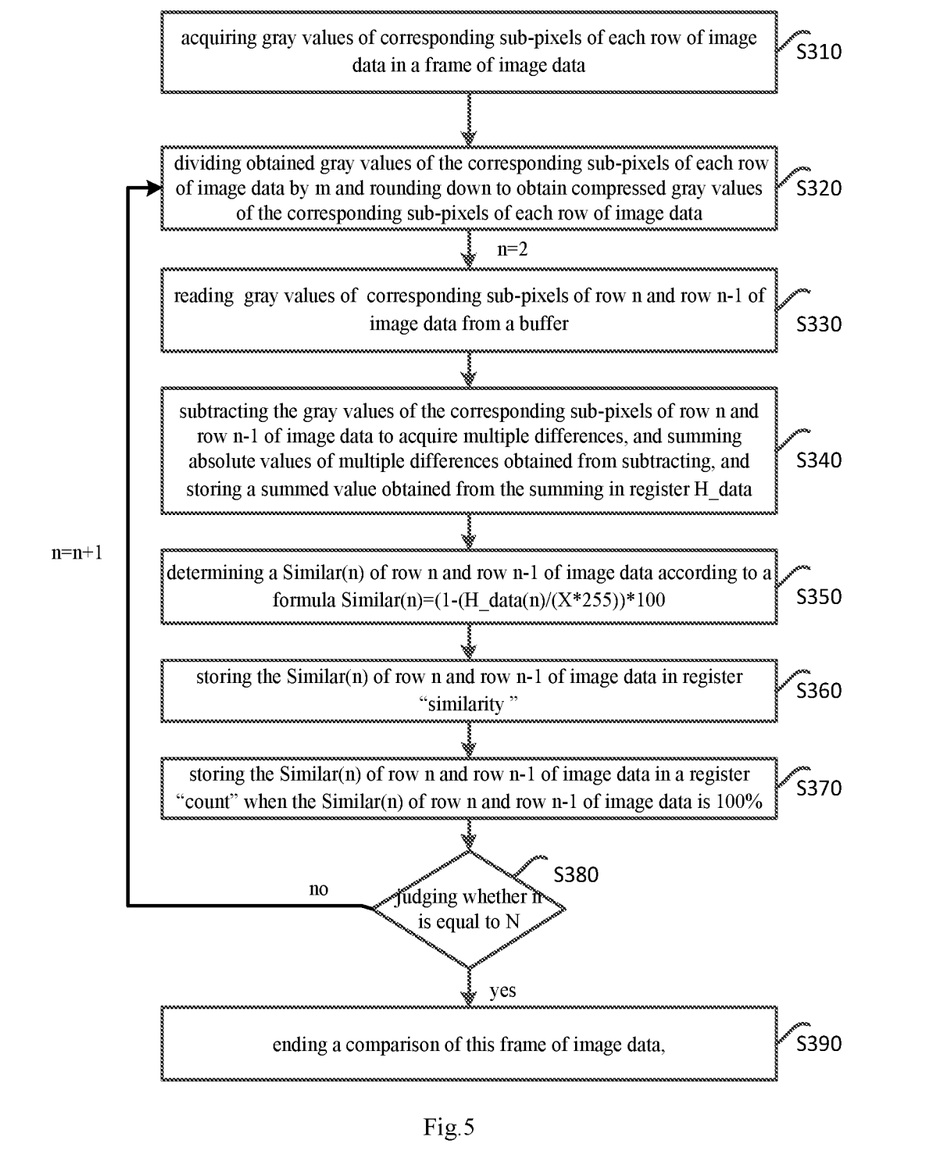
FIG. 5 is a flowchart of a method for determining similarity of adjacent rows of an image according to an embodiment.

The embodiments of the present application further provide a method for determining similarity of adjacent rows of an image, as shown in FIG. 5, the method includes:

Step S310, obtaining gray values of corresponding sub-pixels of each row of image data in a frame of image data;

Step S320, dividing obtained gray values of the corresponding sub-pixels of each row of image data by m and rounding down to obtain compressed gray values of the corresponding sub-pixels of each row of image data, where m is any one of 2, 4, 8 and 16;

Step S330, reading compressed gray values of the corresponding sub-pixels of row n and row n−1 of image data from a buffer;

Step S340, subtracting the compressed gray values of corresponding sub-pixels of row n and row n−1 of image data to acquire multiple differences, and summing absolute values of the multiple differences obtained from the subtracting, and storing a summed value obtained from the summing in register H_data.

Step S350, determining a Similar(n) of the row n and the row n−1 of image data according to a formula Similar(n)= (1−(H_data(n)/(X*Y))*100%, where Y is related to m, when m=2, Y=127; when m=4, Y=63; when m=8, Y=31; and when m=16, Y=15;

Step S360, storing the Similar(n) of the row n and the row n−1 of image data in register "similarity";

Step S370, storing the Similar(n) of the row n and the row n−1 of image data in a register "count" when the Similar(n) of the row n and the row n−1 of image data is 100%;

Step S380, judging whether n equates to N, in determining that n equates to N, ending processing, otherwise increasing n by 1, that is n=n+1 and returning to Step S330 to repeat Step S330 to Step S380;

Step S390, ending a comparison of this frame of image data.

An initial value of n is 2.

By compressing obtained gray values of corresponding sub-pixels of each of row of image data, subtracting compressed gray value of corresponding sub-pixels of two adjacent rows of image data, summing absolute values of multiple differences obtained from subtracting, determining similarity of the two adjacent rows according to a summed value obtained from the summing, and judging whether it is the last row, the above method for determining similarity of adjacent rows of an image can accurately and quickly determine similarity of all adjacent rows in a frame of image data, and is able to reduce storage capacity of the storage register by compressing and meanwhile reduce costs.

In one of embodiments, obtaining gray values of corresponding sub-pixels of image data in a frame of image data includes: calculating gray values of corresponding sub-pixels of each row of image data in the frame of image data to acquire the gray values of the corresponding sub-pixels of each row of image data.

In one of embodiments, m is 2 or 4.

It should be understood that although each step in the flowchart of FIGS. 1-5 are shown in sequence as indicated by the arrows, these steps are not necessarily executed in the order indicated by the arrows. Unless explicitly stated herein, the execution of these steps is not strictly limited to the order, and can be executed in other orders. Moreover, at least part of the steps in FIGS. 1-5 can include multiple sub-steps or multiple stages. These sub-steps or stages are not necessarily executed at the same time, but can be executed at different times, and the sub-steps or stages are not necessarily performed sequentially, but can be performed in turn or alternately with at least part of other steps or sub-steps of the other steps or stages of the other steps.

The present application also provides a display device, including an apparatus for determining the similarity of adjacent rows of an image, the apparatus includes a processor and a memory. The processor is configured to execute a computer program stored in the memory to implement the following steps: obtaining feature values of corresponding sub-pixels of each row of image data in a frame of image data; compressing obtained feature values of corresponding sub-pixels of each row of image data to obtain compressed feature values of corresponding sub-pixels of each row of image data; subtracting compressed feature values of corresponding sub-pixels of two adjacent rows of image data in the frame of image data, summing absolute values of multiple differences obtained from the subtracting, and determining similarity of the two adjacent rows of image data in the frame of image data according to a summed value obtained from the summing.

In one of embodiments, a feature value of a corresponding sub-pixel includes any one of gray value, chroma and brightness, etc. of the corresponding sub-pixel.

In one of embodiments, a feature value of a corresponding sub-pixel is a gray value of the corresponding sub-pixel. Obtaining feature values of the corresponding sub-pixels of each row of image data in a frame of image data, includes: calculating gray values of corresponding sub-pixels of each row of image data in a frame of image data to acquire the gray values of the corresponding sub-pixels of each row of image data.

In one of embodiments, compressing obtained feature values of the corresponding sub-pixels of each row of image data to obtain compressed feature values of corresponding sub-pixels of each row of image data includes: dividing obtained gray values of the corresponding sub-pixels of each row of image data by m and rounding down to obtain compressed gray values of the corresponding sub-pixels of each row of image data, where m is any one of 2, 4, 8 and 16.

In one of embodiments, determining similarity of the two adjacent rows of image data in the frame of image data according to a summed value obtained from the summing includes: determining similarity of the two adjacent rows of image data according to formula Similar(n)=(1−(H_data(n)/ (X*Y))*100%. Where Similar(n) is similarity of row n and row n−1 of image data in the frame of image data, n=2, 3 . . . N, with N is a number of total rows in the frame of image data, H_data(n) is a value obtained by summing absolute values of differences obtained from subtracting compressed gray values of corresponding sub-pixels of row n and row n−1 of image data, X is a number of sub-pixels of a row of image data in a frame of image data, Y is related to m, when m=2, Y=127; when m=4, Y=63; when m=8, Y=31; and when m=16, Y=15.

In one of embodiments, the display device includes liquid crystal displays or organic light-emitting diode (OLED) displays.

The technical features in the above-mentioned embodiments can be combined arbitrarily. For more simple description, all possible combinations of the various technical features in the above-mentioned embodiments are not described. However, as long as there are no contradiction in the combination of these technical features, all should be considered to be within the scope described in this description.

The above-mentioned embodiments only express a few implementation modes of the present application, and their descriptions are more specific and detailed, but they should not be interpreted as a limitation on the scope of patents. It should be pointed out that for one of ordinary skill in the art, several modifications and improvements, which all fall within the protection scope of the present application can be made, without departing from the concept of the present application. Therefore, the protection scope of the present application shall be subject to the appended claims.

What is claimed is:

1. A method for determining similarity of adjacent rows of an image, comprising:
    obtaining feature values of corresponding sub-pixels of each row of image data in a frame of image data;
    compressing obtained feature values of the corresponding sub-pixels of each row of image data to obtain compressed feature values of the corresponding sub-pixels of each row of image data;
    subtracting compressed feature values of corresponding sub-pixels of two adjacent rows of image data in the frame of image data, and summing absolute values of multiple differences obtained from the subtracting; and
    determining similarity of the two adjacent rows of image data in the frame of image data according to a summed value obtained from the summing;
    wherein a feature value of a corresponding sub-pixel is a gray value of the corresponding sub-pixel;
    wherein "compressing obtained feature values of the corresponding sub-pixels of each row of image data to obtain compressed feature values of the corresponding sub-pixels of each row of image data", comprising:
    dividing obtained gray values of the corresponding sub-pixels of each row of image data by m and rounding down to obtain compressed gray values of the corresponding sub-pixels of each row of image data, wherein m is any one of 2, 4, 8 and 16;
    wherein "determining similarity of the two adjacent rows of image data in the frame of image data according to a summed value obtained from the summing", comprising:
    determining the similarity of the two adjacent rows of image data according to a formula Similar(n)=(1−(H_data(n)/(X*Y))*100%,
    wherein Similar(n) is similarity of row n and row n−1 of image data in the frame of image data, n=2, 3, . . . N, N is a number of total rows in the frame of image data, H_data(n) is a value obtained by summing absolute values of differences obtained from subtracting compressed gray values of corresponding sub-pixels of the row n and the row n−1 of image data, X is a number of sub-pixels of a row of image data in the frame of image data, Y is related to m, when m=2, Y=127; when m=4, Y=63; when m=8, Y=31; and when m=16, Y=15.

2. The method according to claim 1, wherein "obtaining feature values of corresponding sub-pixels of each row of image data in a frame of image data", comprising:
    calculating the gray values of the corresponding sub-pixels of each row of image data in the frame of image data to acquire the gray values of the corresponding sub-pixels of each row of image data.

3. A method for determining similarity of adjacent rows of an image, comprising:
    obtaining feature values of corresponding sub-pixels of each row of image data in a frame of image data, a number of total rows in the frame of image data being N;
    compressing obtained feature values of the corresponding sub-pixels of each row of image data to obtain compressed feature values of the corresponding sub-pixels of each row of image data;
    subtracting compressed feature values of corresponding sub-pixels of row n and row n−1 of image data in the frame of image data, and summing absolute values of multiple differences obtained from the subtracting;
    determining similarity of the row n and the row n−1 of image data in the frame of image data according to a summed value obtained from the summing; and
    judging whether n equates to N, in determining that n equates to N, ending processing, in determining that n is not equal to N, increasing n by 1 and returning to "subtracting compressed feature values of corresponding sub-pixels of row n and row n−1 of image data in the frame of image data, and summing absolute values of multiple differences obtained from the subtracting";
    wherein an initial value of n is 2;
    wherein a feature value of a corresponding sub-pixel is a gray value of the corresponding sub-pixel;
    wherein "obtaining feature values of corresponding sub-pixels of each row of image data in a frame of image data", comprising:
    calculating gray values of the corresponding sub-pixels of each row of image data in the frame of image data to obtain the gray values of the corresponding sub-pixels of each row of image data;
    wherein "compressing obtained feature values of corresponding sub-pixels of each row of image data to obtain compressed feature values of corresponding sub-pixels of each row of image data", comprising:
    dividing obtained gray values of the corresponding sub-pixels of each row of image data by m and rounding down to obtain compressed gray values of the corresponding sub-pixels of each row of image data, wherein m is any one of 2, 4, 8 and 16;
    wherein "determining similarity of the row n and the row n−1 of image data in the frame of image data according to a summed value obtained from the summing", comprising:
    determining similarity of the row n and the row n−1 of image data according to a formula Similar(n)=(1−(H_data(n)/(X*Y))*100%, wherein H_data(n) is a value obtained by summing absolute values of differences obtained from subtracting compressed gray values of corresponding sub-pixels of the row n and the row n−1 of image data, X is a number of sub-pixels of a row of image data in the frame of image data, Y is related to m, when m=2, Y=127; when m=4, Y=63; when m=8, Y=31; and when m=16, Y=15.

4. The method according to claim 3, wherein "determining similarity of the row n and the row n−1 of image data in the frame of image data according to a summed value obtained from the summing", further comprising:

storing a determined Similar(n) of the row n and the row n−1 of image data in register similarity.

5. The method according to claim 4, wherein "determining similarity of the row n and the row n−1 of image data in the frame of image data according to a summed value obtained from the summing", further comprising:

storing the determined Similar(n) in register count when a value of the determined Similar(n) is 100%.

6. A display device, comprising an apparatus for determining similarity of adjacent rows of an image, the apparatus comprising: a processor and a memory, and the processor configured to execute a computer program stored in the memory to implement the following steps:

obtaining feature values of corresponding sub-pixels of each row of image data in a frame of image data;

compressing obtained feature values of the corresponding sub-pixels of each row of image data to obtain compressed feature values of the corresponding sub-pixels of each row of image data;

subtracting compressed feature values of corresponding sub-pixels of two adjacent rows of image data in the frame of image data, and summing absolute values of multiple differences obtained from the subtracting; and determining similarity of the two adjacent rows of image data in the frame of image data according to a summed value obtained from the summing;

wherein a feature value of a corresponding sub-pixel is a gray value of the corresponding sub-pixel, "obtaining feature values of corresponding sub-pixels of a row of image data in a frame of image data", comprising:

calculating gray values of the corresponding sub-pixels of each row of image data in the frame of image data to acquire the gray values of the corresponding sub-pixels of each row of image data;

wherein "compressing obtained feature values of corresponding sub-pixels of each row of image data to obtain compressed feature values of corresponding sub-pixels of each row of image data", comprising:

dividing obtained gray values of the corresponding sub-pixels of each row of image data by m and rounding down to obtain compressed gray values of corresponding sub-pixels of each row of image data, where m is any one of 2, 4, 8 and 16;

wherein "determining similarity of the row n and row n−1 of image data in the frame of image data according to a summed value obtained from the summing", comprising:

determining the similarity of the two adjacent rows of image data according to a formula $Similar(n) = (1 - (H\_data(n)/(X*Y)))*100\%$, wherein Similar(n) is similarity of row n and row n−1 of image data in the frame of image data, n=2, 3, . . . N, N is number of total rows in the frame of image data, H_data(n) is a value obtained by summing absolute values of differences obtained from subtracting compressed gray values of corresponding sub-pixels of the row n and the row n−1 of image data, X is a number of sub-pixels of a row of image data in a frame of image data, Y is related to m, when m=2, Y=127; when m=4, Y=63; when m=8, Y=31; and when m=16, Y=15.

7. The display device according to claim 6, wherein the display device comprises liquid crystal displays or organic light-emitting diode (OLED) displays.

* * * * *